United States Patent
Kadowaki

(10) Patent No.: US 8,279,247 B2
(45) Date of Patent: Oct. 2, 2012

(54) IMAGE FORMING APPARATUS AND MANUFACTURING METHOD THEREOF

(75) Inventor: Seijiro Kadowaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 631 days.

(21) Appl. No.: 12/409,183

(22) Filed: Mar. 23, 2009

(65) Prior Publication Data

US 2009/0322848 A1    Dec. 31, 2009

(30) Foreign Application Priority Data

Jun. 30, 2008    (JP) ................... 2008-171206

(51) Int. Cl.
*B41J 2/385* (2006.01)
(52) U.S. Cl. ........................ 347/116; 347/118
(58) Field of Classification Search .......... 347/116, 347/118; 399/301
See application file for complete search history.

(56) References Cited

U.S. PATENT DOCUMENTS

| 5,754,210 | A  | * | 5/1998  | Haneda et al. ........... 347/116 |
| 6,215,511 | B1 |   | 4/2001  | Asako et al. |
| 7,251,055 | B2 | * | 7/2007  | Sawada et al. ........... 358/1.9 |
| 7,417,659 | B2 | * | 8/2008  | Yamamura ............... 347/241 |
| 7,433,545 | B2 | * | 10/2008 | Kita ...................... 382/299 |
| 7,443,535 | B2 | * | 10/2008 | Ishibashi ................. 358/1.9 |
| 7,916,161 | B2 | * | 3/2011  | Kusunose et al. ......... 347/116 |
| 2001/0055120 | A1 |   | 12/2001 | Sawada et al. |
| 2009/0058906 | A1 |   | 3/2009  | Tatsuta |

FOREIGN PATENT DOCUMENTS

| JP | 11-070697   | 3/1999 |
| JP | 2001-301232 | 10/2001 |
| JP | 2002-333755 | 11/2002 |
| JP | 2006-088394 | 4/2006 |
| JP | 2006-231563 | 9/2006 |
| JP | 2006-305763 | 11/2006 |

OTHER PUBLICATIONS

Notification of Reasons for Refusal for Japanese Patent Application No. 2008-171206 mailed on May 11, 2010.

* cited by examiner

*Primary Examiner* — Julian Huffman
*Assistant Examiner* — Sharon A Polk
(74) *Attorney, Agent, or Firm* — Banner & Witcoff, Ltd.

(57) ABSTRACT

An image forming apparatus can include exposure units having light emitting elements, a forming unit which has a photoreceptor exposed by the exposure unit and forms an image on a body to be transferred, an acquisition unit for acquiring a tilt angle error between an approximated line of a first pattern formed by the forming unit based on exposure of one exposure unit and an approximated line of a second pattern formed by the forming unit based on exposure of another exposure unit, and an adjustment unit for adjusting at least one of a light emitting time lag of the light emitting elements and an angular error of the exposure units between the one exposure unit and the other exposure unit to restrain the tilt angle error.

12 Claims, 15 Drawing Sheets

IMAGE FORMING APPARATUS AND MANUFACTURING METHOD THEREOF

CROSS REFERENCE TO RELATED APPLICATION

This application claims priority from Japanese Patent Application No. 2008-171206 filed Jun. 30, 2008. The entire content of this priority application is incorporated herein by reference.

TECHNICAL FIELD

The present invention relates to an image forming apparatus and a manufacturing method thereof.

BACKGROUND

One of electrophotographic image forming apparatuses comprises, for example, an LED head having a plurality of LEDs (light emitting elements) arranged in a row, and forms an electrostatic latent image by exposing a photoreceptor line by line by this LED head. A color image forming apparatus comprises a plurality of above-mentioned LED heads corresponding to each color, and forms an electrostatic latent image by each LED head, so that a color image is ultimately formed on a body to be transferred, with each color image developed from respective electrostatic latent images overlapped one after another.

Here, it is ideal for an LED head to comprise LEDs all aligned in a straight line. However, such an LED head is difficult to manufacture, and thus, in an actual LED head, a part of LEDs is distributed out of a straight line. Moreover, this arrangement distribution of LEDs is different for each LED head. Consequently, the above image forming apparatus may produce a different shape of exposing line for each LED head corresponding to each color, and, as a result, a color image having a positional deviation (color deviation) between each color image is formed on a body to be transferred, thereby causing degradation of image quality.

One proposed solution includes an image forming apparatus that is capable of conducting correction processing for restraining degradation of image quality caused by the difference of arrangement distribution of LEDs. In particular, an arrangement deviation amount of each LED in a sub-scanning direction is recorded in a memory as correction data, and a timing of light emission of each LED is adjusted so as to offset the above-mentioned arrangement deviation amount based on the correction data, thereby allowing an exposure pattern to become closer to an ideal straight line.

SUMMARY

In the above-mentioned image forming apparatus, when the timing of light emission of LEDs can be respectively adjusted by a rather small unit number at a fine correction unit, an exposure pattern may become closer to an ideal straight line. However, this requires a memory area to be secured for recording an enormous quantity of correction data. Consequently, it has actually been difficult to bring an exposure pattern closer to an ideal straight line, and thus, there has been a problem that a color image was formed based on an exposure pattern of nonlinear line, without sufficiently restraining positional deviations (color deviation) between each color image on a body to be transferred.

An image forming apparatus can include exposure units having light emitting elements, a forming unit which has a photoreceptor exposed by the exposure unit and forms an image on a body to be transferred, an acquisition unit for acquiring a tilt angle error between an approximated line of a first pattern formed by the forming unit based on exposure of one exposure unit and an approximated line of a second pattern formed by the forming unit based on exposure of another exposure unit, and an adjustment unit for adjusting at least one of a light emitting time lag of the light emitting elements and an angular error of the exposure units between the one exposure unit and the other exposure unit to restrain the tilt angle error.

BRIEF DESCRIPTION OF THE DRAWINGS

Illustrative aspects in accordance with the invention will be described in detail with reference to the following figures wherein.

DETAILED DESCRIPTION

One aspect of the present invention is described as referring now to FIGS. 1 to 8.

[Entire Configuration of Printer]

Figure 1:
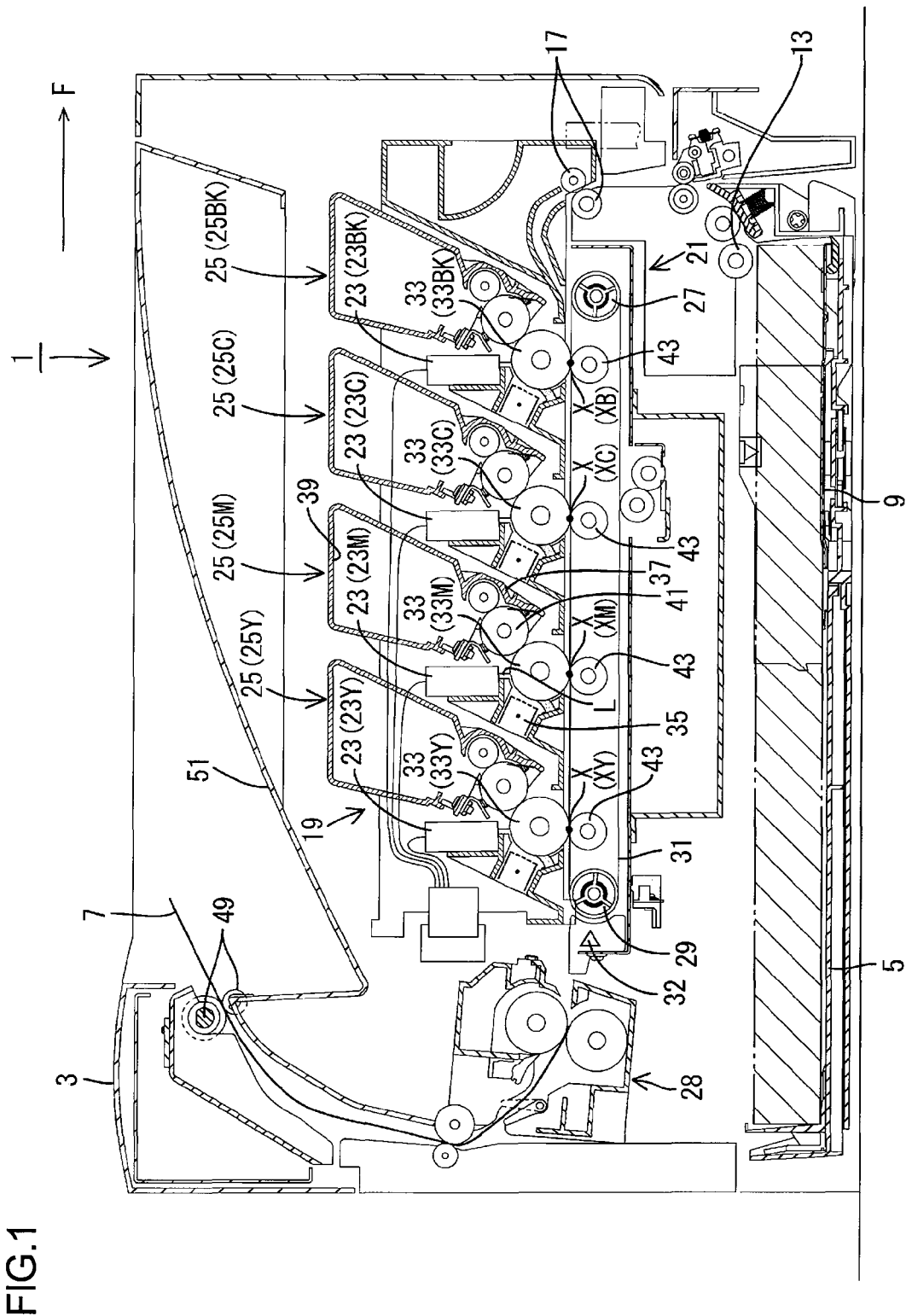
FIG. 1 is a sectional side view showing a general configuration of a printer in one aspect according to the present invention.

FIG. 1 is a sectional side view showing a general configuration of a printer 1 according to the present aspect (one example of an "image forming apparatus" according to the present invention). Additionally, in the following explanation, the right hand of the page space in FIG. 1 is the front of the printer 1 and shown with "F direction" in the figure.

As shown in FIG. 1, the printer 1 is a color LED printer of direct-transfer tandem type and capable of forming a color image with toners of various colors (e.g. black BK, cyan C, magenta M, and yellow Y) on a recording medium 7 (for example, sheet material such as a paper or plastic sheet and the like: one example of "body to be transferred" according to the present invention). The printer 1 has a plurality of components corresponding to each color. Hereinafter, when distinguishing each components by colors, BK (black), C (cyan), M (magenta), and Y (yellow) are added to the reference numerals of those components.

The printer 1 comprises a casing 3, and in the bottom of the casing 3, a paper tray 5 is provided, and on the paper tray 5, a recording medium 7 is stacked. The recording medium 7 at the uppermost position is pressed toward a pick-up roller 13 by a pressing plate 9, and delivered to a registration roller 17 due to the rotation of the pick-up roller 13. The registration roller 17 conducts a skew correction of the recording medium 7, before delivering the recording medium 7 to a belt unit 21 at a prescribed timing.

The image forming unit 19 can include the belt unit 21 as an example of a delivery mechanism, an exposing unit 23, a processing unit 25 (one example of "forming unit" according to the present invention), and a fixing unit 28.

The belt unit 21 includes belt 31 (one example of "body to be transferred" according to the present invention) disposed as extending between a pair of support rollers 27 and 29. The belt 31 circulates in a counterclockwise direction in FIG. 1 due to, for example, the rotational drive of a support roller 29 in the rear side, and delivers the recording medium 7 positioned on the belt 31 to the rear direction. And also, in the rear side of the belt unit 21, a pair of pattern sensors 32 and 32 (FIG. 1 shows only one pattern sensor 32 on one side) are provided side by side in the right and left direction. These pattern sensors 32 and 32 (one example of "optical sensor" according to the present invention) are optical and used for detecting a pattern formed on the belt 31. Each pattern sensor 32 outputs a detection signal S1 corresponding to a pattern on the belt 31, which moves within a detection area of the pattern sensor 32.

The printer 1 comprises exposing units 23 (23BK, 23C, 23M, and 23Y) that can correspond to each color: black, cyan, magenta, and yellow. Each exposing unit 23 comprises a plurality of light emitting diodes 30 (LED chips: one example of "light emitting element" according to the present invention) arranged in a row along an axial direction of a photoreceptor drum 33 (a depth direction in the page of FIG. 1: hereinafter referred to as "main scanning direction"), and controls ON/OFF of the plurality of light emitting diodes 30 based on image data of each color, so as to expose the photoreceptor drum 33 line by line and form an electrostatic latent image.

Processing units 25 are provided corresponding to each color: black, cyan, magenta, and yellow. Each processing unit 25 can have a similar configuration, except the toner color, and can include photoreceptor drum 33 (one example of "photoreceptor" according to the present invention), a charger 35, and a developing cartridge 37. The developing cartridge 37 can include a toner storing chamber 39 and a developing roller 41, and the toner in the toner storing chamber 39 is supplied onto the developing roller 41.

The surface of the photoreceptor drum 33 is uniformly and positively charged by the charger 35. After that, each line is exposed by a light L emitted from the exposing unit 23, thereby forming an electrostatic latent image corresponding to each color image. Next, the toner held on the developing roller 41 is supplied to the electrostatic latent image formed on the surface of the photoreceptor drum 33. This allows the electrostatic latent image on the photoreceptor drum 33 to become a visible image as a toner image of each color.

After that, while a transfer bias is applied to a transfer roller 43, and the recording medium 7 being delivered by the belt 31 is passed through each transfer position between the photoreceptor drum 33 and the transfer roller 43, the toner image held on the surface of each photoreceptor drum 33 is sequentially transferred to the recording medium 7. The recording medium 7 to which a toner image has been transferred in the above manner is then heat-fixed by the fixing unit 28, before being discharged onto a catch tray 51 by the paper-discharging roller 49.

[Electrical Configuration of Printer]

Figure 2:
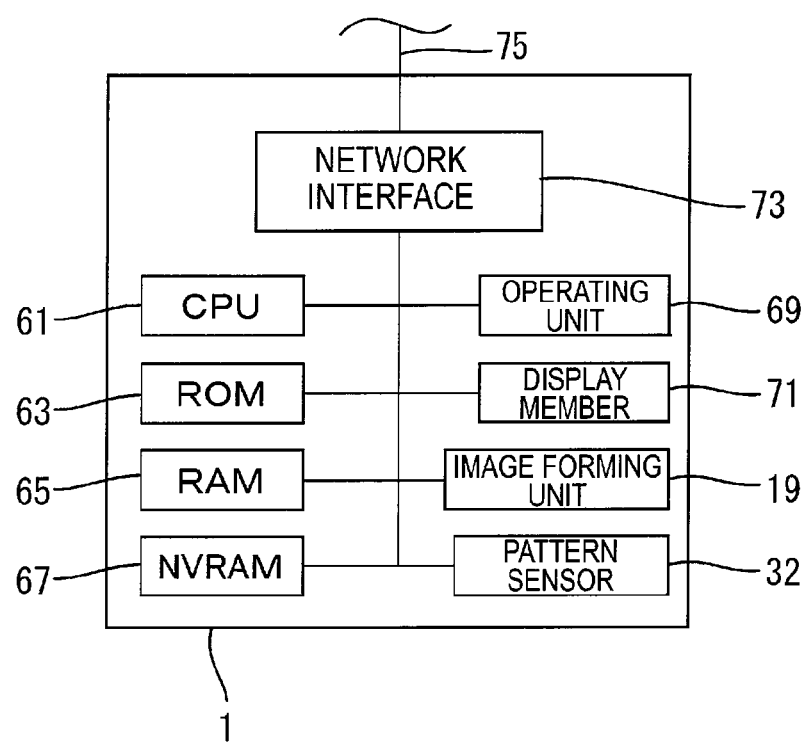
FIG. 2 is a block diagram showing an electrical configuration of a printer.

FIG. 2 is one example of a block diagram showing an electrical configuration of the above-mentioned printer 1. The printer 1 can include a CPU 61, a ROM 63, a RAM 65, a NVRAM 67, an operating unit 69, a display member 71, the previously-mentioned image forming unit 19, a network interface 73, and a pattern sensor 32.

The ROM 63 records various programs (including the later-described program for correction processing of light emission timing) for controlling operations of the printer 1, and, in accordance with the program read out from the ROM 63, the CPU 61 controls the operation of the printer 1, while at the same time, recording the processing results into the RAM 65 and NVRAM 67.

The operating unit 69 comprises a plurality of buttons and allows an user to conduct various inputting operations such as directing print-start. The display member 71 is constituted by a liquid crystal display and a lamp, and capable of displaying such as various setting screens and operational states. The network interface 73 can be connected to an external computer (not shown) via a communication line 75, so as to enable mutual data communication. In addition, the CPU 61 is constituted so as to be capable of retrieving a detection signal S1 sent from each pattern sensor 32.

[Configuration of LED Head]

Figure 3:
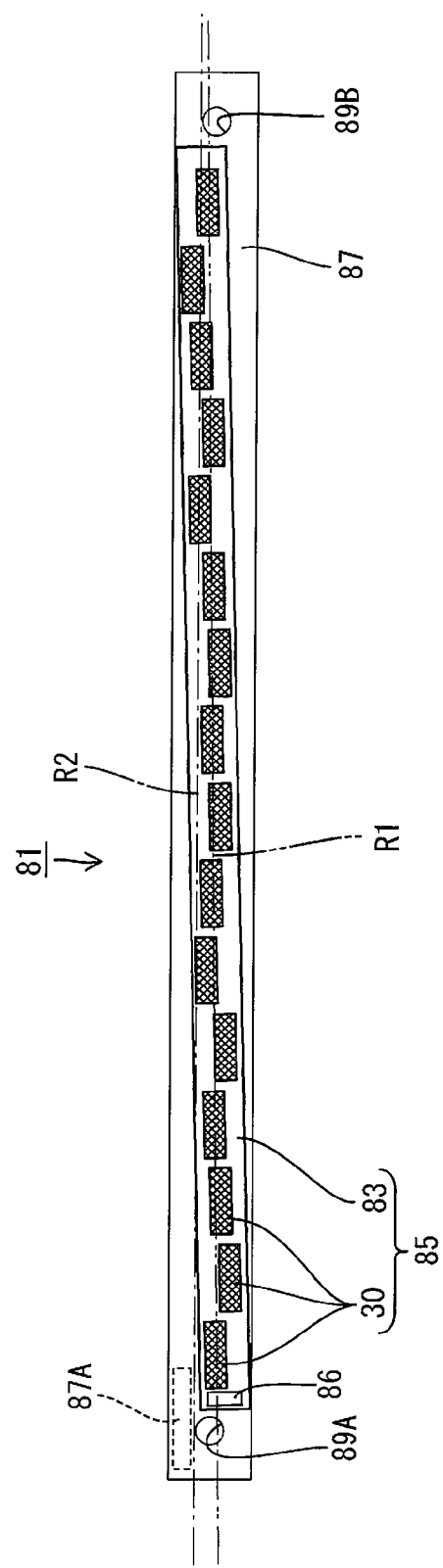
FIG. 3 is a pattern diagram showing a configuration of an LED head.

FIG. 3 is a pattern diagram showing a configuration of the LED head 81. As shown in the figure, the LED head 81 (one example of "exposure unit" according to the present invention) is respectively provided in each exposing unit 23. In particular, the LED head 81 can include a light emitter 85 and a support member 87 supporting the light emitter 85. The light emitter 85 can include the above-mentioned plurality of light emitting diodes 30 aligned on a elongated substrate 83. In addition, a memory 86, such as EEPROM, is provided on the substrate 83. Also, in the both ends of the support member 87, reference holes 89A and 89B are formed so that a fixing pin (not shown) can pass there through, thereby fixing the support member 87 to the inside of the casing 3. In the following description, the reference hole 89A is a reference hole positioned in the left side in FIG. 3, while the reference hole 89B is a reference hole positioned in the right side in the same figure.

[Degradation of Image Quality Based on Difference of Arrangement Distribution of Light Emitting Diode]

It is ideal for the exposing unit 23 to have all the light emitting diodes 30 aligned in a straight line (for example, a line R1 connecting the light emitting diode 30 in a position closest to the reference hole 89A and the light emitting diode 30 in a position closest to the reference hole 89B (one example of "a line connecting both ends of a plurality of light emitting elements"). However, as shown in FIG. 3, not all the light emitting diodes 30 are aligned on the above-mentioned line R1 in the actual exposing unit 23, and a part of the light emitting diodes 30 are distributed in positions out of the line R1.

Such positional unevenness of a group of the light emitting diodes 30 may be different for each LED head 81 due to manufacturing errors. Therefore, when a tendency of the positional unevenness of the light emitting diodes 30 is different for each other between the above four LED heads 81 assembled in the printer 1, a shape of the exposing line differs for each LED head 81. Consequently, a color image, with positional deviation (color deviation) of each color image occurred on the recording medium 7, is formed, and this may cause image quality degradation.

In addition, each LED head 81 may also have a different tilt of the arrangement direction of the light emitting diodes 30 other than the positional unevenness of the light emitting diodes 30, due to a manufacturing error. According to the present aspect, as shown in FIG. 3, a longitudinal direction of the support member 87 is defined as, for example, a direction of the straight line R2 connecting the above-mentioned reference holes 89A and 89B (in particular, connecting the centers, the upper ends, or the lower ends of both the reference holes 89A and 89B).

On the other hand, an arrangement direction of the light emitting diode 30 is defined as a direction of the above-mentioned straight line R1. Therefore, when a tilt of this arrangement direction is different for each other between the above four LED heads 81, the exposing lines of each of the LED heads 81 become nonparallel each other, and thereby can degrade image quality. Naturally, an angular error between the four LED heads 81 is also a cause for the exposing lines to be nonparallel to each other. As mentioned, the arrangement distribution of a group of the light emitting diodes 30 is decided on the basis of reasons such as positional unevenness, difference of arrangement direction, and difference of angular error of the light emitting diodes 30. And also, this arrangement distribution of a group of the light emitting diodes 30 may be different for each LED head 81.

[Operation of Printer]

Figure 4:
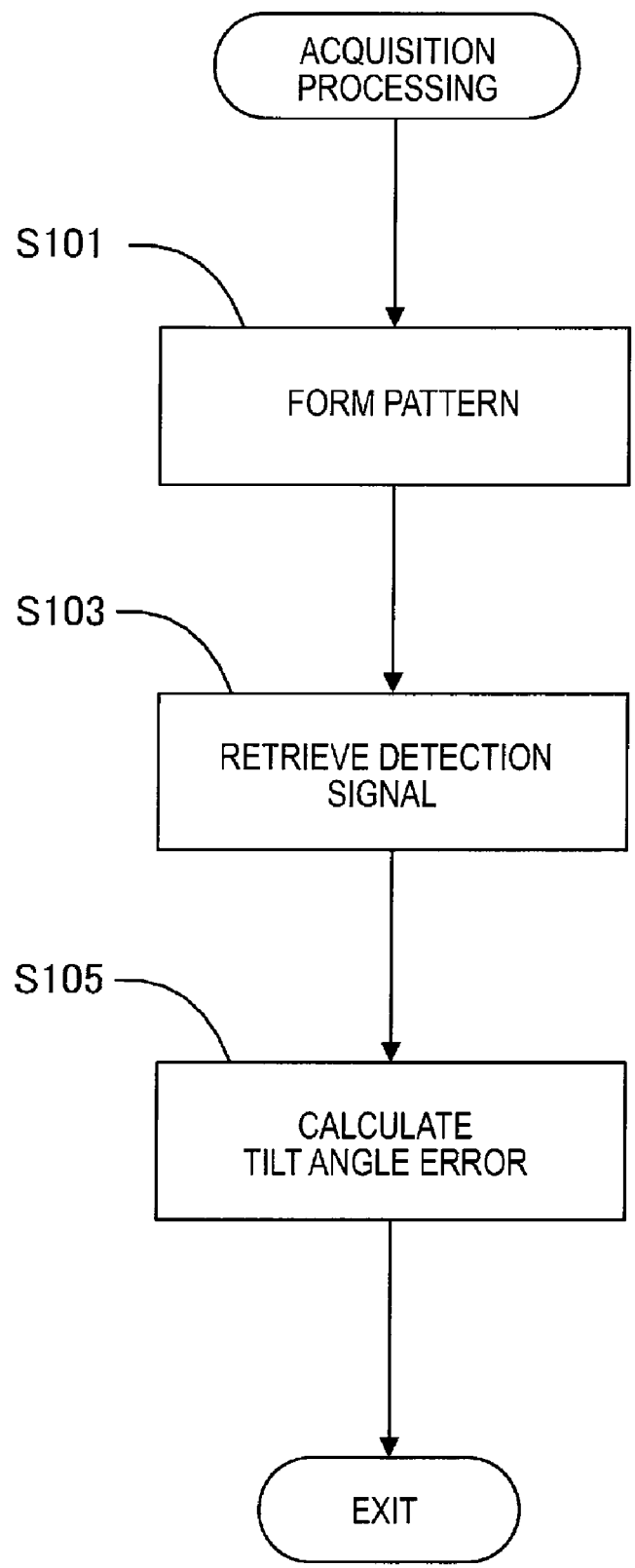
FIG. 4 is a flow chart showing acquisition processing.
Figure 5:
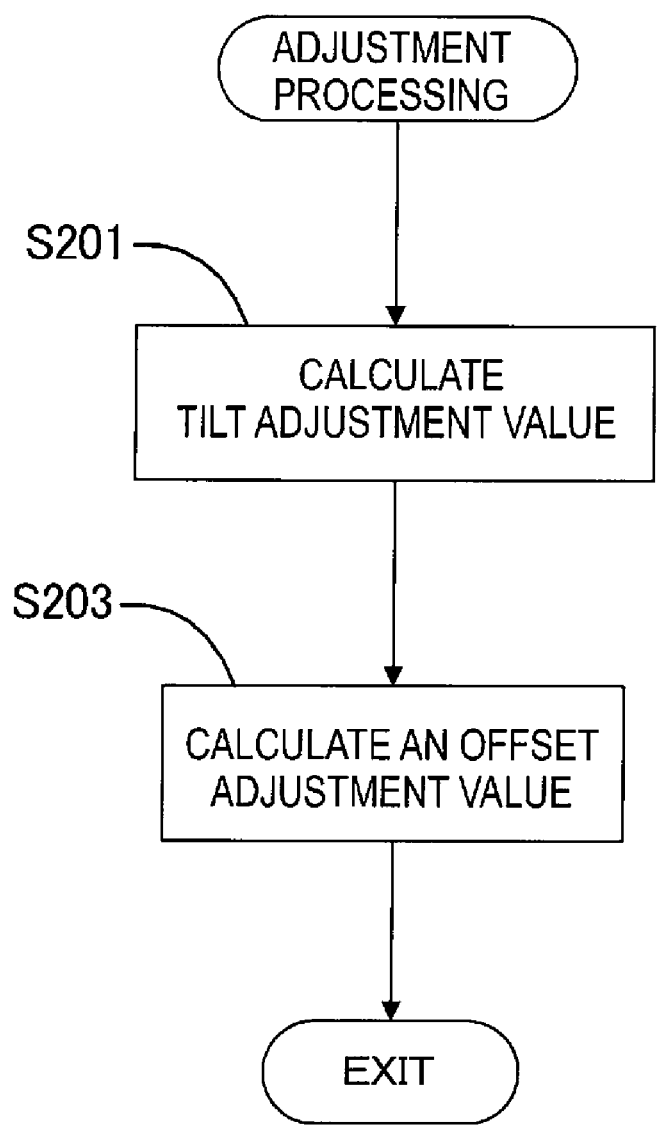
FIG. 5 is a flow chart showing adjustment processing.

FIGS. 4 and 5 show correction processing of light emission timing (acquisition processing and adjustment processing). The CPU 61 executes correction processing of light emission timing in order to control degradation of image quality based on the above-mentioned difference of arrangement distribution of the light emitting diode. In addition, in the present aspect, black BK is a reference color, while other colors (cyan C, magenta M, and yellow Y) are adjusting colors. With a light emission timing of the LED head 81BK for black as a reference, a light emission timing of each of the LED heads 81C, 81M and 81Y is corrected. The above-mentioned correction processing of light emission timing is therefore executed for each adjusting color. In what follows, correction processing of light emission timing is explained, with the LED head 81C for cyan as an example. Additionally, a positional deviation in the sub-scanning direction between the LED heads 81 is assumed not occurred.

The correction processing of light emission timing is executed based on that a printing instruction is received from, for example, an external data processing (not shown) through the network interface 73, or received through an inputting operation of an user using the operation unit 69. This correction processing of light emission timing includes acquisition processing and adjustment processing.

(1) Acquisition Processing

The CPU 61 firstly executes acquisition processing shown in FIG. 4. Here, the CPU 61 functions as "acquisition unit" according to the present invention. This acquisition processing acquires an tilt angle error ΔR. The tilt angle error ΔR is formed between an approximated line DBK of a line pattern PBK that is formed on the belt 31 by the processing unit 25BK for black color, and an approximated line DC of a line pattern PC that is formed on the belt 31 by the processing unit 25C for cyan.

In S101, the CPU 61 controls the processing unit 25BK for black color so that a line pattern PBK (one example of "first pattern" according to the present invention) is formed on the belt 31, and also controls the processing unit 25C for cyan so that a line pattern PC (one example of "second pattern" according to the present invention) is formed on the belt 31. In addition, when the pattern sensor 32 is disposed on the upper surface of the belt 31, the line patterns PB and PC may be formed on the recording medium 7.

Figure 6:
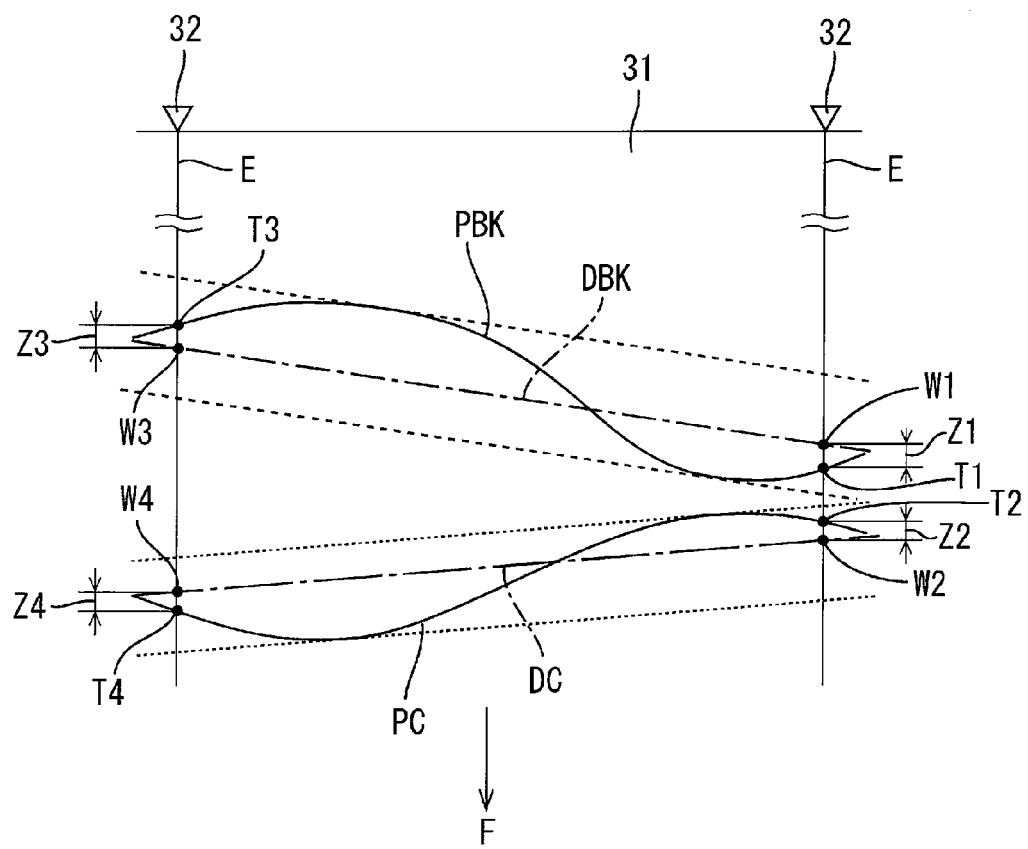
FIG. 6 shows a line pattern formed on a belt.

FIG. 6 shows the line patterns PBK and PC formed on the belt 31. The vertical direction of the figure is a sub-scanning direction (the upward is the down stream direction of the belt 31, also the backward of the printer 1), and the horizontal direction is the main scanning direction. In the figure, a symbol E is indicating a part on the belt 31 which passes through a detection area of the pattern sensor 32 (hereinafter, referred to as "detectable part E").

Also, FIG. 6 shows the approximated lines DBK and DC of each of the line patterns PBK and PC. However, the approximated lines DBK and DC are virtual straight lines in the acquisition processing, and not actually formed on the belt 31. And also, in the present aspect, the approximated lines DBK and DC are preliminarily calculated in, for example, the manufacturing stage of the printer 1. For example, on the basis of positional information of each of the light emitting diodes 30 on each of the LED heads 81BK and 81C (hereinafter referred to as "LED position information": one example of "positional information of a light emitting element" in the present invention), a sum of absolute values of deviation amounts between a position of each light emitting diode 30 and an arbitrary straight line (or the sum of the present deviation amounts raised to the even number power) is calculated. A straight line of the minimum sum (for example, a regression line by means of a least-square method) is each of the approximated lines DBK and DC.

For example, an n-th position of the light emitting diode 30 on each of the LED heads 81BK and 81C is Q (n)=(XN, YN), while the approximated lines DBK and DC are y=Ax+B. Then, when a regression line by means of a least-square method is each of the approximated lines DBK and DC, A and B that make D in the next formula 1 the minimum are found. "n" is preferred to be 3 or larger.

$$D = \sum_{n=1}^{N} \{y_n - (Ax_n + B)\}^2 = \quad \text{[Formula 1]}$$

$$\{y_1 - (Ax_1 + B)\}^2 + \{y_2 - (Ax_2 + B)\}^2 + \Lambda$$

Additionally, at the time of manufacturing the LED head 81, LED position information may be preliminarily recorded in the above-mentioned memory 86 in the LED head 81. In such a case, the recorded LED position information can be used for calculating each of the approximated lines DBK and DC.

Here, each line pattern PBK (PC) is formed by the processing unit 25BK (25C) based on, for example, one or a plurality of exposing lines of the LED head 81BK (81C) for black color (cyan). Therefore, this line pattern PBK (PC) has a shape according to the positional unevenness of a group of the light emitting diodes 30 in the LED head 81BK (81C). Consequently, the approximated line DBK (DC) is no other than an approximated line for the above positional unevenness.

Each of line patterns PBK and PC move to the side of the detection area of the pattern sensor 32 due to the rotation of the belt 31. This allows intersection points T1 and T2 of one end (for example, the right side) of each line pattern PBK and PC and the detectable part E to sequentially pass the detection area of the one pattern sensor 32, so that the present one pattern sensor 32 outputs a detection signal S1 according to the detected timings of the intersection points T1 and T2. While at the same time, intersection points T3 and T4 of the other end (for example, the left side) of each line pattern PBK and PC and the detectable part E sequentially pass the detection area of the other pattern sensor 32, so that the present other pattern sensor 32 outputs a detection signal S1 according to the detected timings of the intersection points T3 and T4. The CPU 61 retrieves each of these detection signals S1 in S103.

Next, the CPU 61 calculates the above-mentioned tilt angle error ΔR in S105, based on, for example, the above detection signal S1. In particular, the CPU 61 firstly counts a time lag between the detected timings of the intersection points T1 and T3 based on the above detection signal S1, and then finds a positional relationship (for example, a deviation amount in the sub-scanning direction) between the intersection points T1 and T3 based on the time lag and the moving speed of the belt 31. On the other hand, the deviation amounts Z1 and Z3 between each intersection point T1 and T3 and the approximated line DBK are preliminarily recorded in, for example, the NVRAM 67. Consequently, based on the positional relationship between the intersection points T1 and T3 and the deviation amounts Z1 and Z3, intersection points W1 and W3 of the approximated line DBK and the detectable part E are calculated, so that a positional relationship between these intersection points W1 and W3 (for example, a deviation amount in the sub-scanning direction) can be found.

In addition, the CPU 61 counts a time lag between the detected timings of the intersection points T2 and T4 based on the above detection signal S1, and then finds a positional relationship (for example, a deviation amount in the sub-scanning direction) between the intersection points T2 and T4 based on the time lag and the moving speed of the belt 31. On the other hand, the deviation amounts Z2 and Z4 between each intersection point T2 and T4 and the approximated line DC are preliminarily recorded in, for example, the NVRAM 67. Consequently, based on the positional relationship between the intersection points T2 and T4 and the deviation amounts Z2 and Z4, intersection points W2 and W4 of the approximated line DC and the detectable part E are calculated, so that a positional relationship between these intersection points W2 and W4 (for example, a deviation amount in the sub-scanning direction) can be found.

The positional relationship between the intersection points W1 and W3 is in accordance with a tilt angle of the approximated line DBK, while the positional relationship between the intersection points W2 and W4 is in accordance with a tilt angle of the approximated line DC, and therefore, a tilt angle error ΔR can be acquired from these positional relationships, completing the acquisition processing. Additionally, the CPU 61 in the present aspect regards the tilt angle error ΔR as a deviation amount between the intersection points W1 and W3 in the sub-scanning direction, and as a deviation amount between the intersection points W2 and W4 in the sub-scanning direction.

(2) Adjustment Processing

Figure 7:
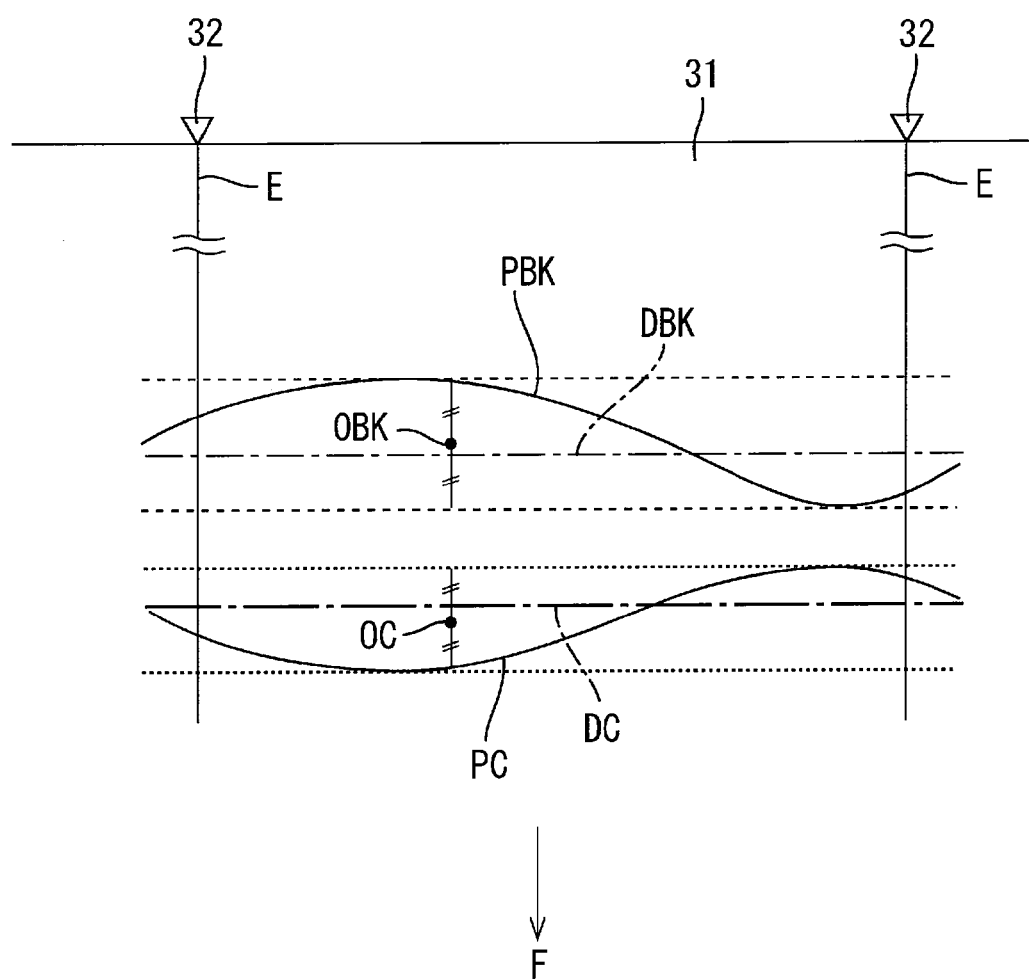
FIG. 7 is a view virtually showing a line pattern and an approximated line after tilt adjustment.
Figure 8:
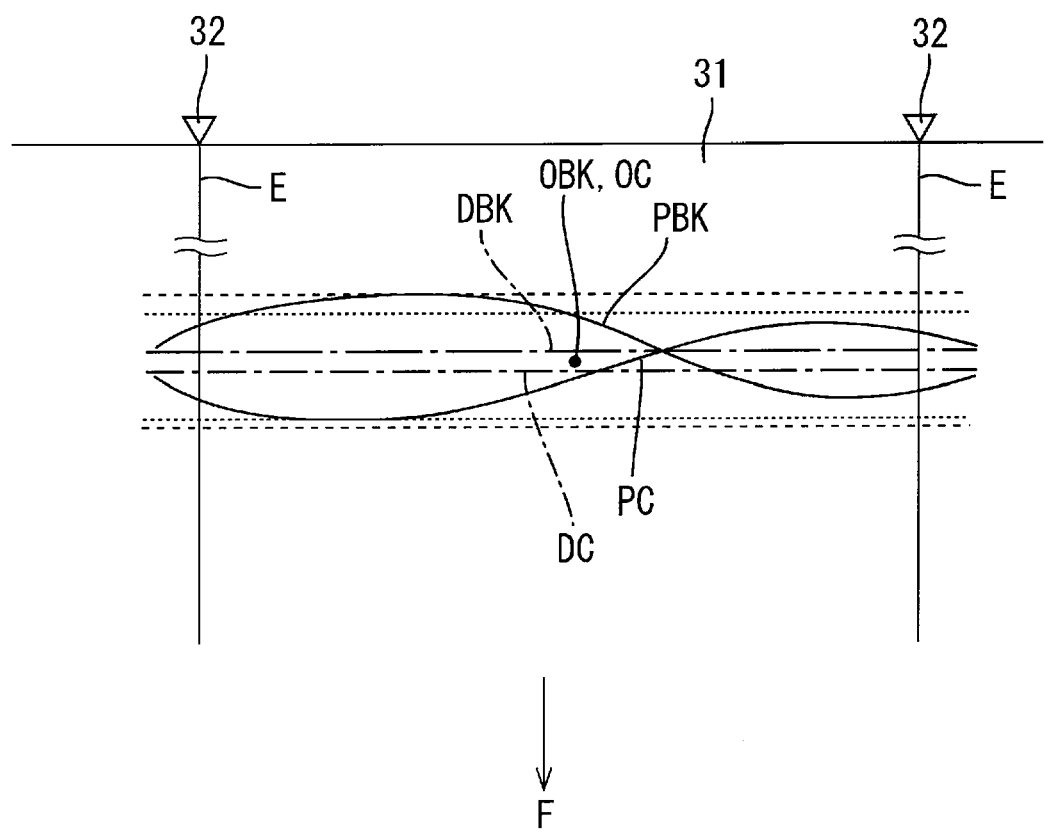
FIG. 8 is a view virtually showing a line pattern and an approximated line after offset adjustment.

FIGS. 7 and 8 are views virtually showing the line patterns PBK and PC and the approximated lines DBK and DC in a process of adjustment processing (after tilt adjustment and offset adjustment). The CPU 61 executes the adjustment processing shown in FIG. 5 after the above acquisition processing. Here, the CPU 61 functions as "adjustment unit" according to the present invention.

A tilt adjustment value is calculated in S201. This tilt adjustment value is for adjustment of a light emission time lag between each of the light emitting diodes 30 in each LED head 81B and 81C, in regard to one line in image data to be subjected to image forming processing based on the above printing instruction. This tilt adjustment value allows a tilt angle error ΔR acquired in the above acquisition processing to be nearly zero, in other words, as shown in FIG. 7, allows both of the approximated lines DBK and DC to be nearly-parallel each other.

Moreover, the CPU 61 also calculates a reference color adjustment value in the present aspect. This reference color adjustment value is for adjustment of a light emission time lag between each of the light emitting diodes 30 in each LED head 81B and 81C, in regard to one line in the above image data. This reference color adjustment value enables both the nearly-parallel approximated lines DBK and DC to be virtually-parallel in the sub-scanning direction. This reference color adjustment value can be calculated based on a positional relationship between the above-mentioned intersection points W1 and W3.

Next, the CPU 61 calculates an offset adjustment value in S203. This offset adjustment value is for adjustment of a time lag of exposure start of the LED head 81BK relative to the LED head 81C. This offset adjustment value allows a positional deviation between a black image and a cyan image on the recording medium 7, generated in accordance with a difference between a transfer position XBK of the black image and a transfer position XC of a the cyan image, to be offset.

Here, for example, a value for offsetting a deviation amount between the nearly-parallel approximated lines DBK and DC in the sub-scanning direction may be an offset adjustment value. However, in the present aspect, the next method calculates an offset adjustment value. As shown in FIG. 7, regarding each line pattern PBK (PC), a center point OBK (OC) in a direction orthogonal to the approximated line DBK (DC) is found, and a deviation amount data between this center point OBK (OC) and the approximated line DBK (DC) is preliminarily recorded in, for example, the NVRAM 67. Based on this deviation amount data, as shown in FIG. 8, a value for offsetting a deviation amount between the center point OBK and the center point OC is regarded as an offset adjustment value. This completes the adjustment processing.

Next, in regard to the above-mentioned image data (raster data), the CPU 61 moves a position of each dot pattern on the same image line onto, for example, another line in accordance with the above-mentioned tilt adjustment value and the reference adjustment value, and transfers the image data to the image forming unit 19. In this regard, the tilt adjustment value and the reference adjustment value may be understood as an adjustment value for adjusting so-called "light emission position" of the light emitting diode 30. In addition, as mentioned above, the tilt adjustment value is an adjustment value for making both of the approximated lines DBK and DC nearly-parallel each other, and thus, a shift amount (adjustment value) between each dot pattern on the same image line has a linear relationship according to the position of each dot pattern. The CPU 61 also adjusts a time lag of exposure start of the LED head 81C relative to the LED head 81BK, based on the above-mentioned offset adjustment value. This enables a light emission timing of a group of the light emitting diodes 30 of the LED heads 81BK and 81C to be adjusted, and at the same time, forms an image on the recording medium 7 based on the above-mentioned image data by the image forming unit 19.

In the present aspect, a linearity correction (also called as a bow correction) for correcting a non-linear line of exposure pattern caused by the positional unevenness of a group of the light emitting diodes 30 into a straight line is not executed. However, the above-mentioned correction processing of light emission timing is executed. In short, a light emission time lag of the light emitting diodes 30 is adjusted so that a tilt angle error AR between the approximated line DBK of the line pattern PBK of a reference line (black) and the approximated lines DC, DM, and DY of the line pattern PC of adjustment colors (cyan, magenta, and yellow) is restrained.

Here, each approximated lines DBK, DC, DM, and DY reflects a tendency of arrangement distribution of a group of the light emitting diodes 30. Therefore, compared with, for example, a case where both the approximated lines DBK and DC shown in FIG. 6 are overlapped as they are unparallel each other, a positional deviation (color deviation) caused by the arrangement distribution of the above-mentioned group of the light emitting diodes 30 can be more restrained between an image pattern formed on the recording medium 7 by the processing unit 25BK for reference color and an image pattern formed on the recording medium 7 by the processing units 25C, 25M, and 25Y for adjustment colors. Consequently, without conducting the above-mentioned linearity correction, and even when any one of each line pattern PBK, PC, PM, and PY is non-linear, the degradation of image quality due to such a reason can be restrained.

And also, in the present aspect, a time lag of exposure start of the LED head 81C (81M and 81Y) for adjustment color relative to the LED head 81BK for reference color is adjusted so as to offset a deviation amount between the center point OBK and the center point OC. This allows a difference (disagreement) of positional unevenness of a group of the light emitting diodes 30 between the LED head 81BK for reference color and the LED head 81C (81M and 81Y) for adjustment color to be restrained, thereby restraining the degradation of image quality.

FIGS. 10 to 15 show another aspect according to the present invention. In the previous aspect, an approximated line is preliminarily calculated and fixed, however, in the present aspect, an approximated line is calculated in the correction processing of light emission timing. This is at least one difference from the previous aspect, and other configurations remain the same. Accordingly, a repetitive description is omitted by allocating the same symbols to the same elements, thereby describing only the difference.

Figure 9:
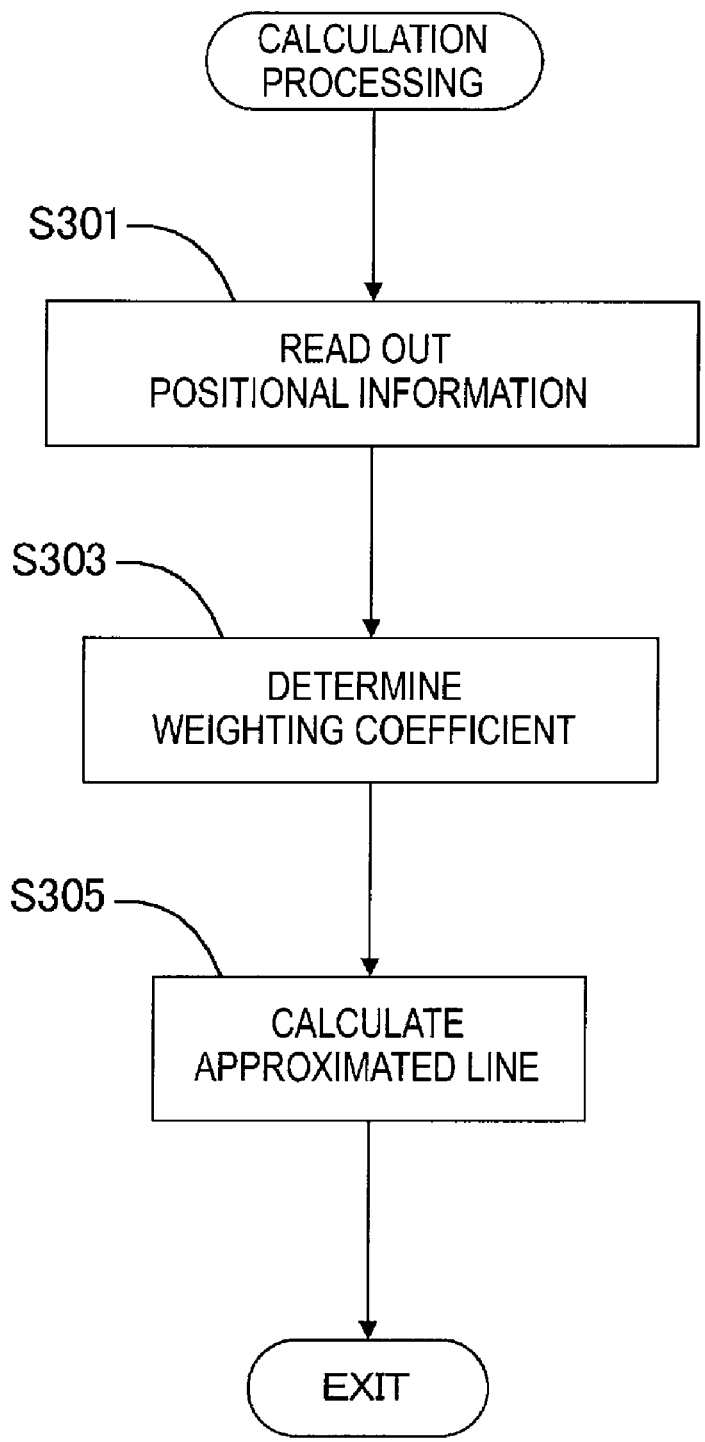
FIG. 9 is a flow chart showing calculation processing in another aspect.

In the present aspect, the CPU 61 executes calculation processing shown in FIG. 9 in the correction processing of light emission timing, prior to the above acquisition processing. The CPU 61 firstly reads out the above-mentioned positional information from the memory 86 in each LED head 81 in S301. When calculating an approximated line by, for example, a least-square method, Formula 2 in which each term in the above Formula 1 (corresponding to a position of each light emitting diode 30) is multiplied by a weighting coefficient (an) is employed.

$$Da = \sum_{n=1}^{N} a_n \{y_n - (Ax_n + B)\}^2 =$$
$$a_1\{y_1 - (Ax_1 + B)\}^2 + a_2\{y_2 - (Ax_2 + B)\}^2 + \Lambda$$

[Formula 2]

The weighting coefficient (an) is changed in S303. The weighting coefficient (an) is changed based on at least one of the next elements (a printing condition and an image pattern should be formed). In this moment, the CPU 61 functions as a "changing unit" according to the present invention.
(a) Size of recording medium for image formation
(b) Setting range of image formation
(c) Existence, arrangement place, and size of color image in image to be formed Additionally, the element above to be used for deciding the weighting coefficient (an) may be selected by, for example, a printing instruction of an user. The elements (a) and (b) can be acquired from the printing condition information which the CPU receives based on the printing instruction, and the element (c) can also be acquired in the development processing of image data.

Figure 10:
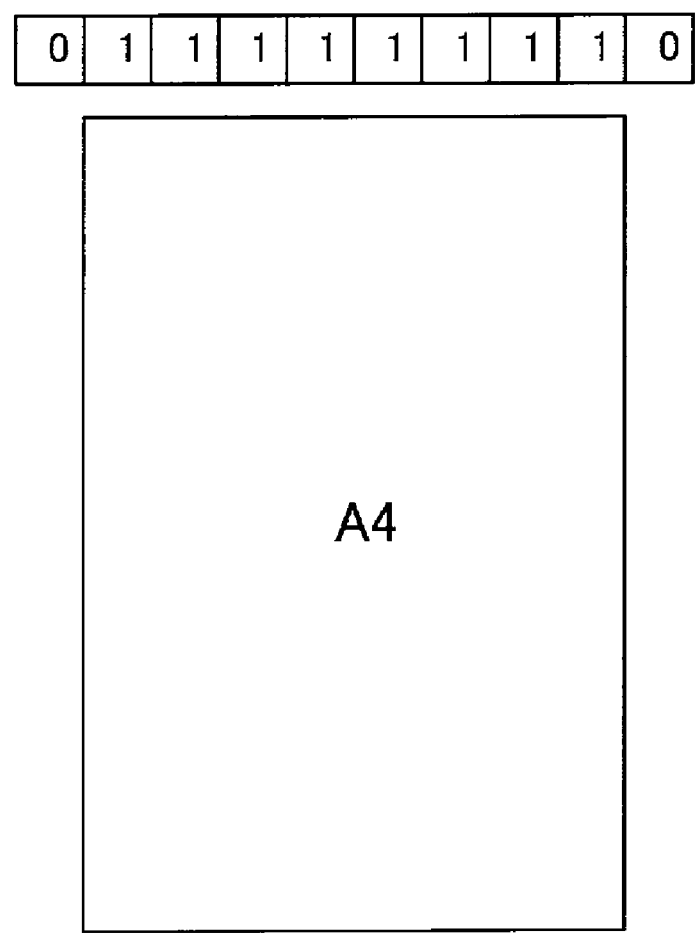
FIG. 10 is a pattern diagram showing a relationship between each element (a) and a weighting coefficient (an)
Figure 11:
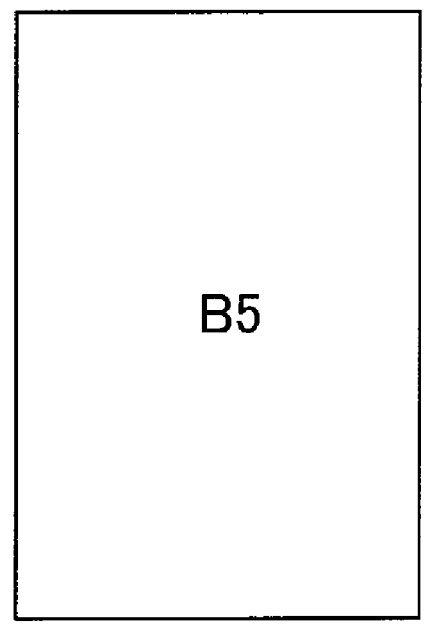
FIG. 11 is a pattern diagram showing a relationship between each element (a) and a weighting coefficient (an)

FIGS. 10 to 15 are pattern diagrams respectively showing a relationship between each element (a) to (c) and a weighting coefficient (an), and the horizontal direction in the page space is the main scanning direction. The upper horizontally long measure in each figure shows a position of each light emitting diode 30, and numbers there within indicate values of the weighting coefficient (an). For example, when deciding the value, as shown in FIGS. 10 and 11, the weighting coefficient values (an) corresponding to the light emitting diodes 30 positioned within the width of each size of the recording medium 7 (for example, A4 size and B5 size) are set to "1", and the weighting coefficient values (an) corresponding to the light emitting diodes 30 positioned outside thereof are set to "0". This allows an approximated line to be calculated, emphasizing on positional information of the light emitting diodes 30 actually forming an image on the recording medium 7 in S305.

Figure 12:
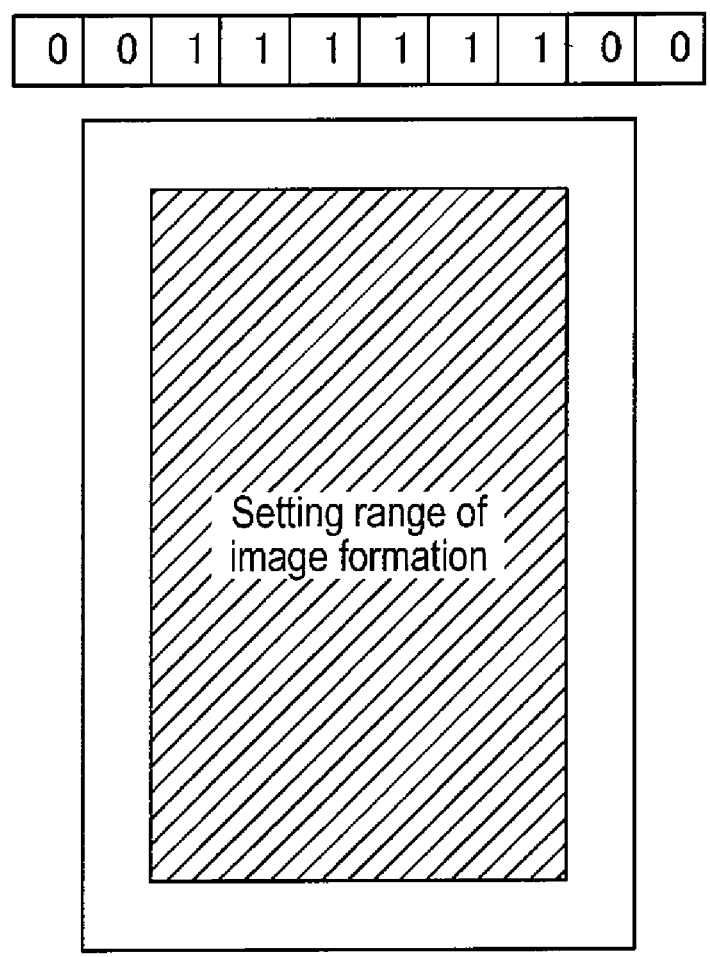
FIG. 12 is a pattern diagram showing a relationship between each element (b) and a weighting coefficient (an)
Figure 13:
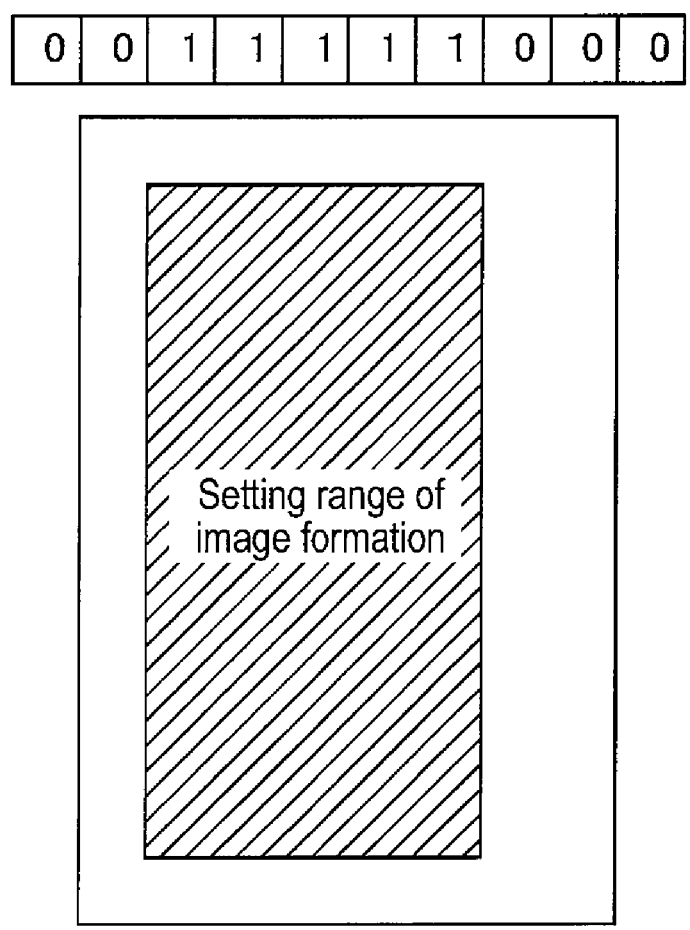
FIG. 13 is a pattern diagram showing a relationship between each element (b) and a weighting coefficient (an)

In addition, when deciding the value, as shown in FIGS. 12 and 13, the weighting coefficient values (an) corresponding to the light emitting diodes 30 positioned within the setting range of image formation are set to "1", and the weighting coefficient values (an) corresponding to the light emitting diodes 30 positioned outside thereof are set to "0". This allows an approximated line to be calculated, emphasizing on positional information of the light emitting diodes 30 actually forming an image within the setting range.

Figure 14:
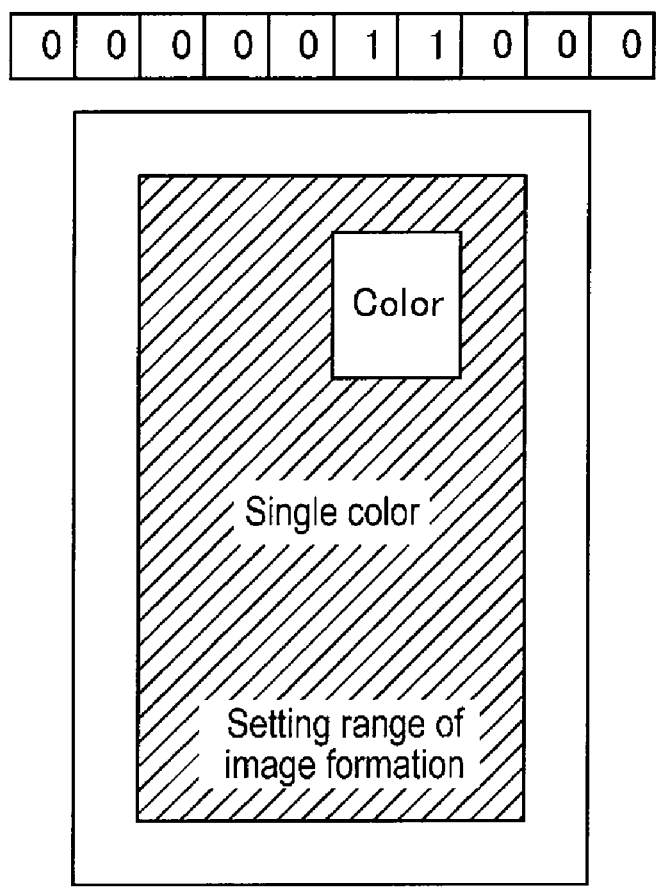
FIG. 14 is a pattern diagram showing a relationship between each element (c) and a weighting coefficient (an)
Figure 15:
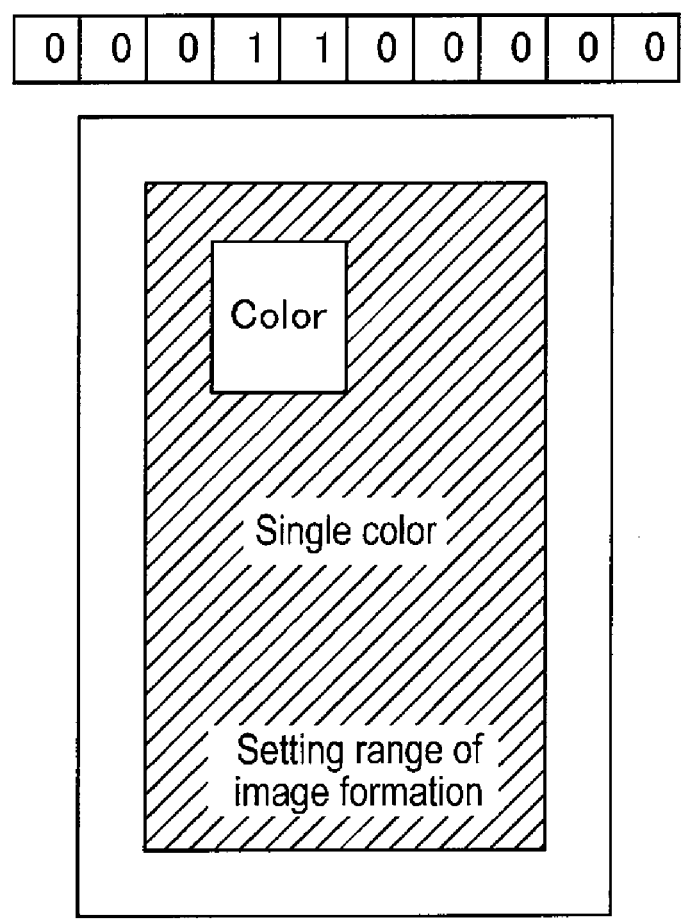
FIG. 15 is a pattern diagram showing a relationship between each element (c) and a weighting coefficient (an).

Furthermore, when deciding the value, as shown in FIGS. 14 and 15, the weighting coefficient values (an) corresponding to the light emitting diodes 30 used for forming a color image in an image to be formed are set to "1", and the weighting coefficient values (an) corresponding to the other light emitting diodes 30 are set to "0". This allows an approximated line to be calculated, emphasizing on positional information of the light emitting diodes 30 that forms a color image having color deviation. Additionally, the weighting coefficient (an) may naturally be other than 0 and 1. A value of the weighting coefficient (an) corresponding to a position of the light emitting diode 30, that should be emphasized, should only be greater than a value of the weighting coefficient (an) corresponding to a position of other light emitting diodes 30.

As mentioned above, according to the present aspect, an appropriate approximated line can be calculated by changing the weighting coefficient in accordance with, for example, an image position that should be emphasized.

The present invention is not limited to the aspects described in the above with reference to the accompanying figures, and, for example, the following can also be included in the technical scope of the present invention.

(1) In the above aspect, the exposing unit 23 comprises the LED head 81, however, "exposure unit" in the present invention is not limited to this. A light emitting element such as an EL (Electro Luminescence) element and a fluorescent body may be multi-arranged, so that these light emitting diodes may selectively emit light in accordance with image data. Or, a light shutter composed of a liquid crystal element and a PLZT may be multi-arranged, so that a light emitted from a light source is controlled by selectively controlling the timing for opening and closing these light shutters.

(2) The printer 1 is a four-color printer and comprises four LED heads 81 corresponding to each one color, however, "image forming apparatus" in the present invention is not limited to this. The printer 1 may be a color printer of a plurality of colors other than four colors (such as two colors and six colors). In addition, a plurality of LED heads 81 may be provided for the same color, and may respectively expose the individual photoreceptor drum 33. However, the present invention is particularly effective in regard to each of the LED heads 81 provided as corresponding to different colors, since a color deviation caused by a difference of distribution tendency of the light emitting diodes between these LED heads 81 might largely affect image quality.

(3) The printer 1 employs a direct transfer tandem system, however, "image forming apparatus" in the present invention is not limited to this. The printer 1 may employ an intermediate transfer system and a so-called four cycle system for exposing common photoreceptors by a plurality of exposure units. And also, the above aspects include the photoreceptor drums 33, however, "photoreceptor" in the present invention is not limited to a drum. It may be, for example, a photoreceptor belt.

(4) In the above aspects, a tilt angle error AR is acquired using the pattern sensor 32, however, the present invention is not limited to this. For example, instead of the pattern sensor 32, an image pickup device (such as CCD and CMOS) may be provided for pickup of the image of a line pattern formed on the belt 31 and finding the tilt angle error AR by image processing. However, the above-mentioned pattern sensor 32 can be used for detecting a density pattern used for density adjustment and a registration pattern used for transfer position adjustment of each color image, and thus, the above aspects are preferable in view of the number of components.

(5) In the second aspect, a weighting coefficient is changed based on each element (a) to (c), however, the present invention is not limited to this. The weighting coefficient may be fixed. In such a case, an approximated line can be preliminarily calculated in the same way as the first aspect. For example, the light emitting diode 30 near the center of a plurality of the light emitting diodes 30 is used mainly for exposing the center part of an image to be formed, and largely and visually affects the image quality of the center part of the present image. Therefore, it is preferred for the calculation of an approximated line, that the arrangement position of the light emitting diode 30 near the center is multiplied by a greater weighting coefficient than the one for multiplying the arrangement position of the light emitting diode 30 near the both ends.

(6) In the second aspect, a weighting coefficient is changed in accordance with a position of the light emitting diode 30, however, the present invention is not limited to this. In a plurality of divided areas obtained by dividing the arrangement region of the above group of the light emitting diodes 30, the number of arrangement positions of the light emitting diodes 30 that is to be used for the calculation of an approximated line may be changed. For example, the light emitting diodes 30 in the divided areas near the center is used mainly for exposing the center part of an image to be formed, and largely and visually affects the image quality of the center part of the present image. Therefore, it is preferred for the calculation of an approximated line to refer to more positional information of the light emitting diodes 30 in the divided areas near the center than that of the light emitting diodes 30 in the divided areas near the both ends. And also, the number of arrangement positions of the light emitting diodes 30 in each divided area may be changed based on the elements (a) to (c) shown in the second aspect.

(7) The above aspects do not conduct a linearity correction. Certainly, it is possible to make an exposing line almost straight when using a lot of positional information of the light emitting diodes 30, however, for that purpose, the processing load for the linearity correction becomes large. And also, a high-capacity memory and high resolution need to be secured. Therefore, in view of these reasons, when the linearity correction is conducted based on, for example, less positional information of the light emitting diodes 30, after all, the exposing line becomes non-linear. In response, in the above aspects, the linearity correction may be executed in the correction processing of the light emitting diode, before executing the acquisition processing and the adjustment processing. Such a configuration can restrain the degradation of image quality, even when the linearity correction cannot make the exposing line straight. In this case, in the acquisition processing, the processing unit 25 therefore forms a line pattern, that has been subjected to the linearity correction (one example of "first pattern" and "second pattern" in the present invention), on the belt 31.

(8) In the above aspects, a tilt angle error AR is restrained by adjusting the light emission time lag of the light emitting diodes 30, however, "adjustment unit" in the present invention is not limited to this. For example, a mechanism capable of adjusting a tilt angle of the LED head 81 may be provided in the exposing unit 23, so that a tilt angle error R is restrained by this mechanism.

(9) In the above aspects, a deviation amount between the center point OBK of the line pattern PBK of a reference color and the center point OC (OM, OY) of the line pattern PC (PM, PY) of an adjustment color is offset in the adjustment processing, however, the present invention is not limited to this. A gravity center point (in other words, a center of mass) of each line pattern may be found so that a deviation amount between the gravity center points is offset.

What is claimed is:

1. An image forming apparatus comprising:
    a plurality of exposure units having a plurality of light emitting elements;
    a forming unit having at least one photoreceptor exposed by the plurality of exposure units, and configured to form an image on a body to be transferred, a first pattern based on exposure of one of the plurality of exposure units, and a second pattern based on exposure of another one of the plurality of exposure units; and
    a memory configured to store positional information that includes a larger number of positions of light emitting elements arranged in a central area than that of light emitting elements arranged in an end area in respective exposure units;
    a processor;
    wherein the memory further stores executable programming that, when executed by the processor, causes the image forming apparatus to provide:
        a calculation unit configured to calculate a first approximated line of the first pattern and a second approximated line of the second pattern based on the positional information;
        an acquisition unit configured to acquire a tilt angle error between the first approximated line and the second approximated line; and
        an adjustment unit configured to adjust at least one of a light emitting time lag of the plurality of light emitting elements and an angular error of the plurality of exposure units between the one of the plurality of exposure units and the other one of the plurality of exposure units to restrain the tilt angle error.

2. The image forming apparatus of claim 1, wherein the executable programming, when executed, further causes the image forming apparatus to provide a calculation unit configured to calculate the first approximated line and the second approximated line based on at least three points on the first pattern and at least three points on the second pattern, respectively.

3. The image forming apparatus of claim 1, wherein the adjustment unit is configured to adjust an exposure start time lag between the one exposure unit and the other exposure unit, so that a deviation between at least one of a center point and a gravity center point of the first pattern in a direction orthogonal to an approximated line of the first pattern and at least one of a center point and a gravity center point of the second pattern in a direction orthogonal to an approximated line of the second pattern is restrained.

4. An image forming apparatus comprising:
a plurality of exposure units having a plurality of light emitting elements;
a forming unit having at least one photoreceptor exposed by the plurality of exposure units, and configured to form an image on a body to be transferred, a first pattern based on exposure of one of the plurality of exposure units, and a second pattern based on exposure of another one of the plurality of exposure units; and
a memory configured to store positional information that includes positions of light emitting elements in respective exposure units;
a processor;
wherein the memory further stores executable programming that, when executed by the processor, causes the image forming apparatus to provide:
a calculation unit configured to calculate a first approximated line of the first pattern and a second approximated line of the second pattern based on the positions of light emitting elements, the positions being multiplied by weighting coefficients defined according to the positions of light emitting elements;
an acquisition unit configured to acquire a tilt angle error between the first approximated line and the second approximated line; and
an adjustment unit configured to adjust at least one of a light emitting time lag of the plurality of light emitting elements and an angular error of the plurality of exposure units between the one of the plurality of exposure units and the other one of the plurality of exposure units to restrain the tilt angle error.

5. The image forming apparatus of claim 4,
wherein the calculation unit is configured to multiply an arrangement position of a light emitting element near a center of the plurality of light emitting elements by a weighting coefficient greater than a weighting coefficient for multiplying an arrangement position of a light emitting element near an end of the plurality of light emitting elements.

6. The image forming apparatus of claim 4 wherein the executable programming, when executed by the processor, further causes the image forming apparatus to provide:
a changing unit configured to change the weighting coefficient by which the arrangement position of the light emitting element near the center of the plurality of light emitting elements is multiplied.

7. The image forming apparatus of claim 6,
wherein the changing unit is configured to change the weighting coefficient in accordance with at least one of printing conditions and image data.

8. The image forming apparatus of claim 4, wherein the adjustment unit is configured to adjust an exposure start time lag between the one exposure unit and the other exposure unit, so that a deviation between at least one of a center point and a gravity center point of the first pattern in a direction orthogonal to an approximated line of the first pattern and at least one of a center point and a gravity center point of the second pattern in a direction orthogonal to an approximated line of the second pattern is restrained.

9. A method, comprising:
forming, by an image forming apparatus that includes a plurality of exposure units having a plurality of light emitting elements, an image on a body to be transferred, a first pattern based on exposure of one of the plurality of exposure units, and a second pattern based on exposure of another one of the plurality of exposure units;
storing positional information that includes a larger number of positions of light emitting elements arranged in a central area than that of light emitting elements arranged in an end area in respective exposure units;
calculating a first approximated line of the first pattern and a second approximated line of the second pattern based on the positional information;
acquiring a tilt angle error between the first approximated line and the second approximated line; and
adjusting at least one of a light emitting time lag of the plurality of light emitting elements and an angular error of the plurality of exposure units between the one of the plurality of exposure units and the other one of the plurality of exposure units to restrain the tilt angle error.

10. The method of claim 9, further comprising:
adjusting an exposure start time lag between the one exposure unit and the other exposure unit, so that a deviation between at least one of a center point and a gravity center point of the first pattern in a direction orthogonal to an approximated line of the first pattern and at least one of a center point and a gravity center point of the second pattern in a direction orthogonal to an approximated line of the second pattern is restrained.

11. A method, comprising:
forming, by an image forming apparatus that includes a plurality of exposure units having a plurality of light emitting elements, an image on a body to be transferred, a first pattern based on exposure of one of the plurality of exposure units, and a second pattern based on exposure of another one of the plurality of exposure units;
storing positional information that includes positions of light emitting elements in respective exposure units;
calculating a first approximated line of the first pattern and a second approximated line of the second pattern based on the positions of light emitting elements, the positions of the light emitting elements being multiplied by weighting coefficients defined according to the positions of light emitting elements;
acquiring a tilt angle error between the first approximated line and the second approximated line; and
adjusting at least one of a light emitting time lag of the plurality of light emitting elements and an angular error of the plurality of exposure units between the one of the plurality of exposure units and the other one of the plurality of exposure units to restrain the tilt angle error.

12. The method of claim 11, further comprising:
adjusting an exposure start time lag between the one exposure unit and the other exposure unit, so that a deviation between at least one of a center point and a gravity center point of the first pattern in a direction orthogonal to an approximated line of the first pattern and at least one of a center point and a gravity center point of the second pattern in a direction orthogonal to an approximated line of the second pattern is restrained.

* * * * *